US008655725B2

(12) United States Patent
Hopwood (10) Patent No.: US 8,655,725 B2
(45) Date of Patent: Feb. 18, 2014

(54) USER-CONTROLLED FILE INTERACTION

(75) Inventor: Michael Hopwood, Jericho, VT (US)

(73) Assignee: Adobe Systems Incorporated, San Jose, CA (US)

( * ) Notice: Subject to any disclaimer, the term of this patent is extended or adjusted under 35 U.S.C. 154(b) by 1608 days.

(21) Appl. No.: 11/731,306

(22) Filed: Mar. 30, 2007

(65) Prior Publication Data
US 2013/0124300 A1    May 16, 2013

(51) Int. Cl.
*G06Q 30/00* (2012.01)
*H04L 12/00* (2006.01)

(52) U.S. Cl.
USPC ........................................ 705/14.53; 370/229

(58) Field of Classification Search
USPC ................................................. 709/224, 232
See application file for complete search history.

(56) References Cited

U.S. PATENT DOCUMENTS 5,913,040 A * 6/1999 Rakavy et al. ................ 709/232
6,317,789 B1 * 11/2001 Rakavy et al. ................ 709/224

OTHER PUBLICATIONS

"What Are the Thumbs Up and Thumbs Down Buttons?" Jul. 5, 2003. <http://tivosupport2.instancy.com/TivoCollection/bb1d90ad-1925-4d9b-a4e9-0e9fe473569f/ins_content.html>.

* cited by examiner

*Primary Examiner* — John G Weiss
*Assistant Examiner* — Marilyn G Macasiano
(74) *Attorney, Agent, or Firm* — Wolfe-SBMC (57) ABSTRACT

User-controlled file interaction is described, including detecting an interaction with a file presented on a client, the interaction indicating a preference associated with the file, selecting other files for presentation based on the preference, the other files being similar to the element, and presenting the other files on the client.

30 Claims, 10 Drawing Sheets

USER-CONTROLLED FILE INTERACTION

CROSS-REFERENCE TO RELATED APPLICATIONS

This application is related to co-pending U.S. patent application Ser. No. 11/726,953, filed Mar. 23, 2007 and entitled "Advertising Rewards and Referrals," which is herein incorporated by reference for all purposes.

FIELD OF THE INVENTION

The present invention relates generally to computer programs and software applications, and online advertising. More specifically, user-controlled file interaction is described.

BACKGROUND OF THE INVENTION

The Internet and World Wide Web allow the access, retrieval, and viewing of various types of content. In general, content can include data and information intended for various purposes, including editorial, special interests, commercial, advertising, business, recreational, political, military, special interests, and others. Conventionally, content for a web page is often inter-mixed with different types of content, such as advertisements (e.g., tile, banner, static, video and audio-based, and other types), which are often used to generate revenue for advertising product or service companies. Advertising and marketing agencies and other entities often invest substantial resources to develop, create, place, and promote goods and services of clients, often using online advertising and marketing vehicles and techniques, such as banner, tile, cube, interstitial, video, audio, multi-media or rich media, and other types. However, online advertisements typically have very low returns on investment. In other words, conventional online advertising techniques typically have large distribution, but very low response rates to discounts, deals, sales, or other advertised sales. Further, gathering and analyzing advertisement and campaign performance information regarding what users like and dislike is often difficult, data mining-intensive, expensive, and time-consuming. Still further, advertisements and other displayed information are typically targeted using conventional techniques that are not effective, accurate, or inexpensive.

Some conventional online advertising techniques provide static information that may be viewed, but not interacted with by a user. Other conventional advertisements allow for user interaction by clicking on or clicking "through" the ad to an off-page link or other destination, where data and information related to the advertisement are presented. Still other conventional advertisements allow users to click on a region of a link, enter information, or provide personal information to obtain an incentive or other reward. However, users are unable to control the delivery and presentation of these advertisements. Further, conventional advertisements do not allow users to determine or control which advertisements are presented. Conventional advertisements that allow for user interaction also do not provide accurate data or information on campaign effectiveness and often fail to provide any information that suggests what users find desirable or undesirable about a given advertisement.

Thus, a solution for gathering user feedback to improve user targeting without the limitations of conventional techniques is needed.

BRIEF DESCRIPTION OF THE DRAWINGS

Various examples are disclosed in the following detailed description and the accompanying drawings.

DETAILED DESCRIPTION

Various embodiments or examples may be implemented in numerous ways, including as a system, a process, an apparatus, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the embodiments has not been described in detail to avoid unnecessarily obscuring the description.

In some examples, the described techniques may be implemented as a computer program or application ("application") or as a module or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including C, Objective C, C++, C#, Flex™, Java™, Javascript™, Ajax, COBOL, Fortran, ADA, XML, HTML, DHTML, XHTML, HTTP, XMPP, and others. Design, publishing, and other types of applications such as Dreamweaver®, Shockwave®, Flash®, and Fireworks® may also be used to implement the described techniques. The described techniques may be varied and are not limited to the examples or descriptions provided.

User-controlled file interaction is described, including presenting advertisements that are configured for user interaction. In some examples, an interaction may be an input such as a mouse click, mouse-over (i.e., moving an icon using an input/output device such as a computer mouse), clicking and dragging, text entry, or the like. An input may be used to provide input as to whether to present a given advertisement, substantially similar or similar advertisements, different types of advertisements, or other types of files. A file, in some examples, may be logical groups of data or information that may be used to instantiate an object, process, or set of objects or processes when invoked. Files may be content such as editorial articles, originally authored articles, documents, images, photos, video, audio, multimedia elements, advertisements, and the like. In other words, other types of data or information besides advertisements may be implemented using the described techniques. Here, an input may be used to control the presentation of advertisements or other types of files. For example, if a given advertisement or file is vetoed, a different type of advertisement may be presented. In other examples, if an advertisement or file is rated using a qualitative or quantitative rating system, the input (i.e., ratings) may be used to determine whether effectiveness of the rated advertisement or file, whether similar advertisements or files should be selected and presented, or whether a category or class of advertisement should be selected, presented, or prevented from presentation. In some examples, similar advertisements may be advertisements that share common feature, design, element (i.e., a design or functional component of an advertisement that is presented with an advertisement), attribute, category, classification, or other characteristic. In other examples, the described techniques may be implemented differently and are not limited to the descriptions provided.

Figure 1A:
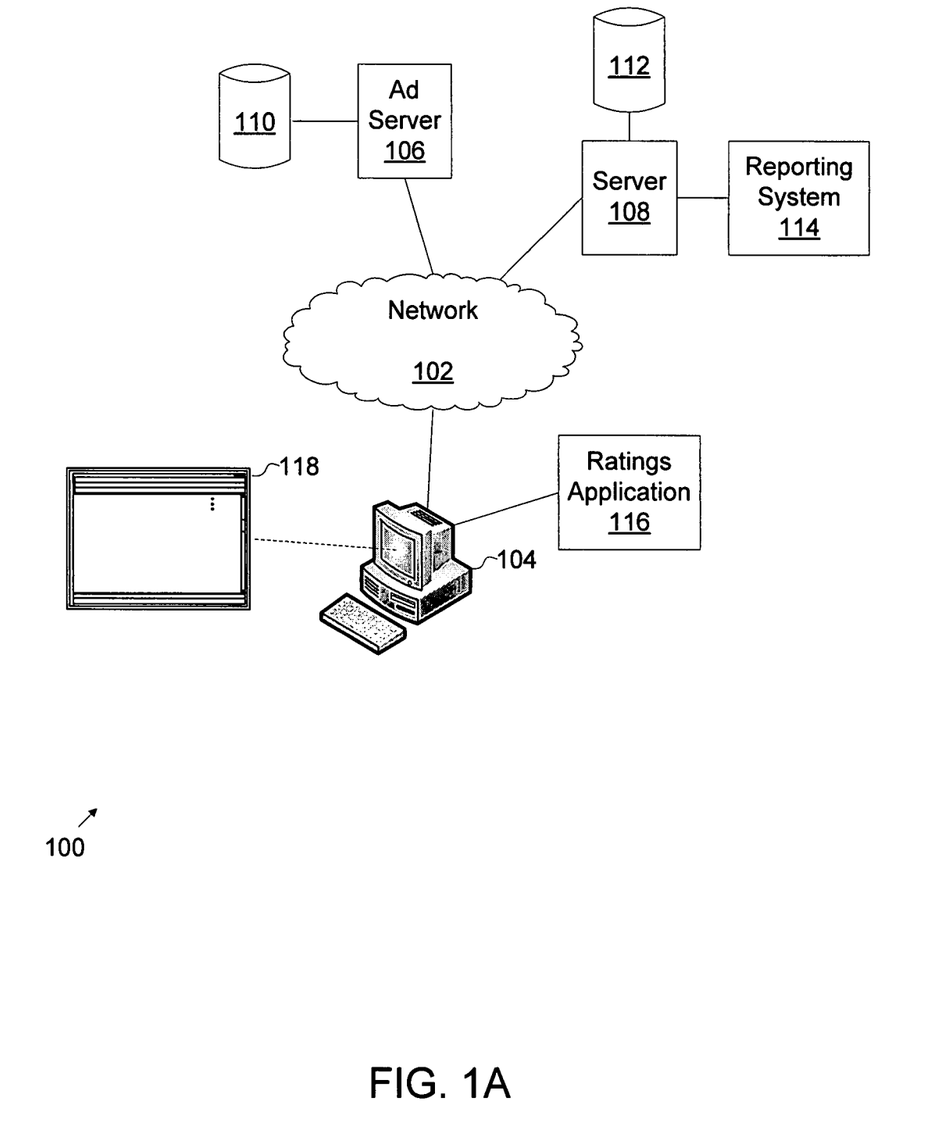
FIG. 1A illustrates an exemplary user-controlled file interaction system.

FIG. 1A illustrates an exemplary user-controlled file interaction system. Here, system 100 includes network 102, client 104, ad server 106, server 108, repositories 110-112, reporting system 114, ratings application 116, and display 118. In some examples, system 100 and the included elements may be varied in number, function, design, and other characteristics, and are not limited to the examples provided. In some examples, network 102 may be the Internet, a local area network (LAN), wide area network (WAN), wireless local area network (WLAN), municipal area network (MAN), or other type of network. Data may be exchanged between client 104 and ad server 106 and server 108, which may be in data communication with repositories (e.g., database, data mart, data warehouse, storage area network (SAN), network attached storage (NAS), and others) 110-112. As an example, data may be requested by client 104. In some examples, data provided may be presented on display 1118, which may be a screen, monitor, or other display for client 104. Data may be used to provide requested content (e.g., an article, document, file, or others) to client 104 and, once presented, may include an advertisement (not shown) retrieved and delivered by ad server 106 from repository 110. In other examples, content may be requested by server 108 and coupled with advertisements or other commercial content served by ad server 106.

In some examples, once content is presented on client 104, ratings application 116 may be invoked to provide ratings and other input (e.g., a numerical rating value, a qualitative input (e.g., yes, no, dislike, like, and others), a veto, and others) in response to a file (i.e., an advertisement or other content). For example, when content is presented on display 118, a user may interact with an advertisement presented with the content by selecting a region, element, or other attribute or characteristic of an advertisement by using an input/output device such as a mouse, scroll wheel, pointer, keyboard, and others. Ratings application 116 may be configured to enable client 104 to provide an input via an interaction that is stored on repository 112. In some examples, stored inputs on repository 112 may be evaluated using reporting system 114 to provide information, reports, analysis, and the like to advertisers on the effectiveness, statistical performance, level of response, and other attributes of an advertisement or other file served by ad server 106 from repository 110. In other examples, system 100 may be configured and implemented differently than shown and described.

Figure 1B:
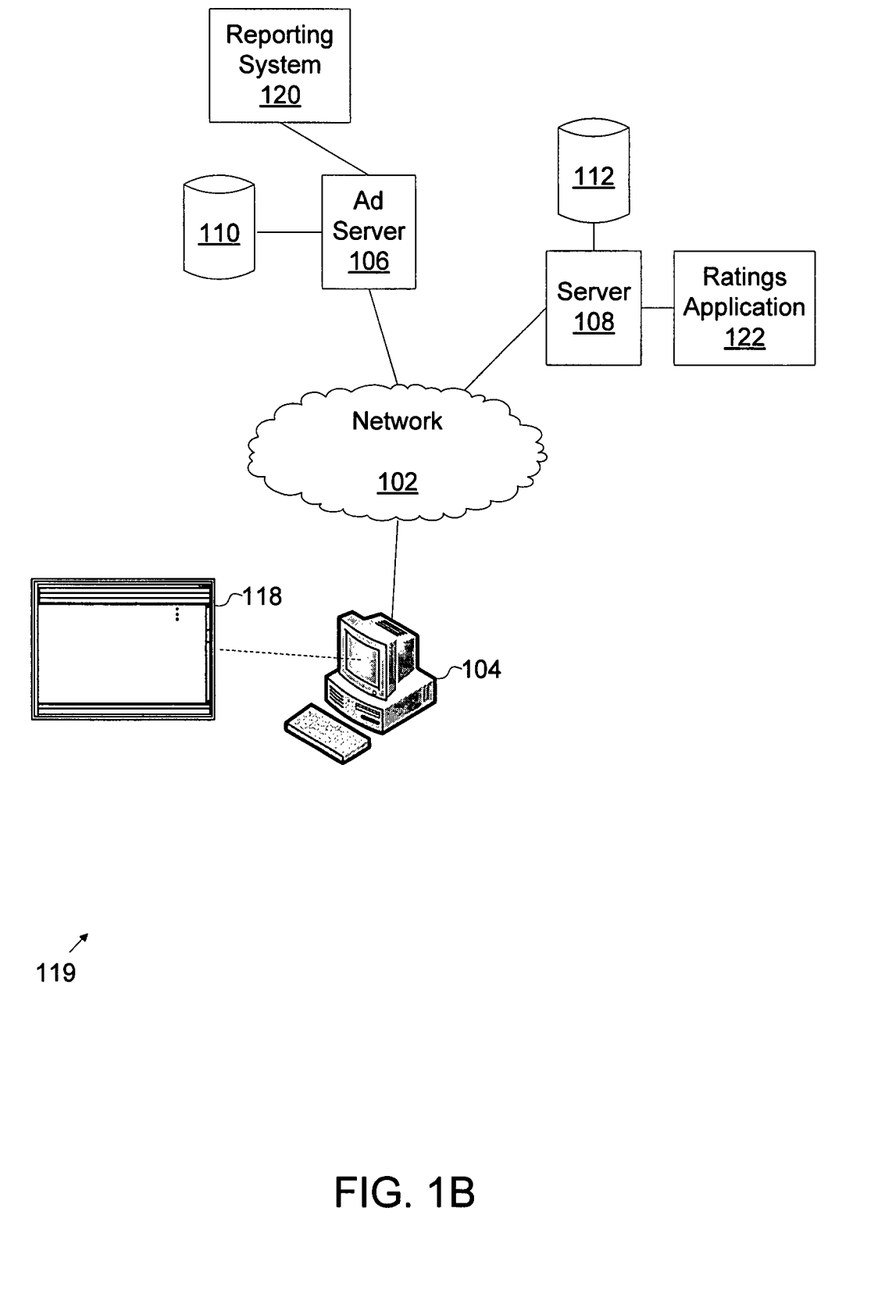
FIG. 1B illustrates an alternative exemplary user-controlled file interaction system.

FIG. 1B illustrates an alternative exemplary user-controlled file interaction system. Here, system 119 includes network 102, client 104, ad server 106, server 108, repositories 110-112, display 118, reporting system 120, and ratings application 122. In some examples, reporting system 120 may be configured in data communication with various elements of system 119. For example, ad server 106 may be in data communication with ad server 106, providing analysis and evaluation of advertisements requested, accessed, or retrieved from repository 110. Likewise, ratings application 122 may be implemented on server 108 and used to provide reports on, for example, performance of content served or delivered to client 104. In other examples, system 119 and the described elements may be varied and are not limited to the function, design, configuration, or operations shown and described.

Figure 2A:
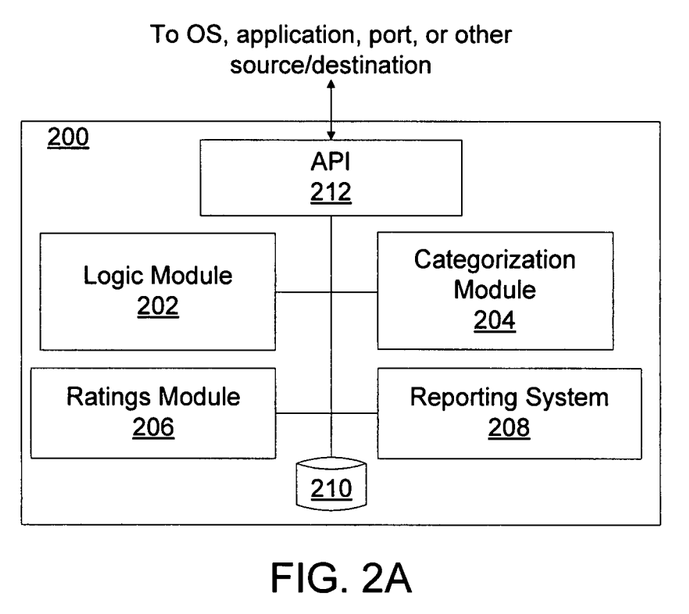
FIG. 2A illustrates an exemplary user-controlled file interaction application.

FIG. 2A illustrates an exemplary user-controlled file interaction application. Here, application 200 includes logic module 202, categorization module 204, ratings module 206, reporting system 208, repository 210, and application programming interface (API) 212. In some examples, application 200 may used to implement ratings application 116 (FIG. 1A) or 122 (FIG. 1B). Logic module 202 may be used to provide control signals and data to one or more of categorization module 204, ratings module 206, reporting system 208, repository 210, and application programming interface 212. Categorization module 204 may be configured to receive and evaluate data received over API 212 from an operating system, application (e.g., web browser, desktop or client application, and others), port, or other source, which may be used to categorize or classify advertisements or other files into groups or categories. In some examples, groups or categories may be determined based on products or services advertised in an advertisement or file. In other examples, groups or categories may be determined using other attributes or characteristics to logically or otherwise group advertisements.

Here, data transferred over API 212 may be used by application 200 to identify user preferences associated with advertisements. API 212 may be used to transfer data between application 200 and the described modules 202-210 and other sources or destinations (e.g., an operating system, another application, port, or other source/destination). In some examples, user preferences may be determined based on input provided in an interaction with an advertisement or file. For example, a user on client 104 (FIG. 1A) may interact with an advertisement by providing a rating. In some examples, a rating may be provided using an application or other facility in which the advertisement or file is presented. In other examples, a rating may be provided directly or indirectly in the advertisement or file. In still other examples, a veto or other subjective, qualitative input may be provided in lieu of a numerical, quantitative input. As yet another example, users may veto an advertisement or group, category, type, or stack (i.e., a group) of advertisements. If a group of advertisements are queued for presentation on display 118 (e.g., FIG. 1A), a veto may be used to remove or prevent some advertisements in the group from being presented. For example, a user may veto advertisements in an automotive category. A veto would then initiate sending data to control and prevent the further presentation of automotive advertisements from inventor associated with a given website. If a user vetoes an advertisement or a category of advertisements, the remaining advertisements in the group may be presented. However, a threshold value may be set to prevent exceeding a maximum number of advertisements from being vetoed. In other words, advertisements in a group may be vetoed to prevent further presentation, but if the vetoed advertisements exceed a certain number or threshold (e.g., 20%) then the complete group of advertisements may be made available for presentation again. In other examples, different types of inputs other than vetoes and ratings may be provided and are not limited to the examples described.

In some examples, repository 210 may be a local database, data mart, data warehouse, or other storage facility for storing data that may be accessed by application 200. For example, data associated with ratings provided by users in response to advertisements may be stored in repository 210. As another example, data used to generate reports by reporting system 208 may be stored and accessed in repository 210. In still other examples, repository 210 may be a remote repository, as described below in connection with FIG. 2B. Here, reporting system 208 may be included as part of application 200 and used to generate reports and other analysis that may be useful to advertisers, marketers, agencies, or other entities or individuals interested in evaluating the effectiveness of a given campaign or advertisement. In other examples, application 200 and the above-described elements may be implemented as an application installed at a single location or at multiple, distributed locations. In some examples, application 200 may be implemented using web services formats (e.g., IEEE WSDL, and others) to provide a distributed application architecture for providing user control of advertisements.

As an example, application 200 may be implemented to provide users control over the presentation of advertisements displayed. For example, an automotive advertisement may be presented in a car repair article. When the advertisement is presented, a user may move an icon over the advertisement or an element (e.g., a region, portion, section, or other sub-area of an advertisement) to enable the presentation of a menu, for example, that allows the user to provide a numerical rating for the advertisement. In other examples, a rating menu or choice of rating values may be presented as part of an advertisement. In still other examples, rating values may be presented within the visual display or appearance of an advertisement. For example, a portion of an advertisement may include rating values and, when a user selects a rating value, data is transmitted from client 104 (FIG. 1A) to ad server 106, server 108, or another destination that stores the rating value. In other examples, when an input/output icon (e.g., pointer, icon, and the like) is moved over an advertisement presented on display 118 (FIG. 1A), a callout, window, or bubble may appear that presents rating values or options to the user, providing an opportunity to provide feedback regarding the presented advertisement. For example, when a boat advertisement is presented, the user may be a sailor and wish to see other similar advertisements. When a rating value is input (e.g., 5 out of a 5-point scale, selecting a radio button adjacent to a grade of "A", and others), data is then sent from client 104 to ad server 106 and server 108, requesting other ads that are similar (i.e., other advertisements for boat auctions, boat sales, boat equipment, sailing training, and the like).

By using ratings or rating values, performance of an advertisement may be measured. If the rating indicates (i.e., is above a pre-established threshold value) that the user likes the advertisement and wants to see other similar (i.e., having one or more attributes in common) advertisements, then application 200 may store this data in repository 210 and generate a report using reporting system 208 that indicates the effectiveness or quality of a given advertisement or advertising campaign. Reports may be used to generate quantitative (e.g., statistical) or qualitative (e.g., subjective input, comments, feedback, and the like) information for advertisers, marketers, authors, and others with summary information of a given advertisement or advertising campaign. In other examples, application 200 may be implemented differently and may also vary in architecture, function, design, operation, or other attributes.

Figure 2B:
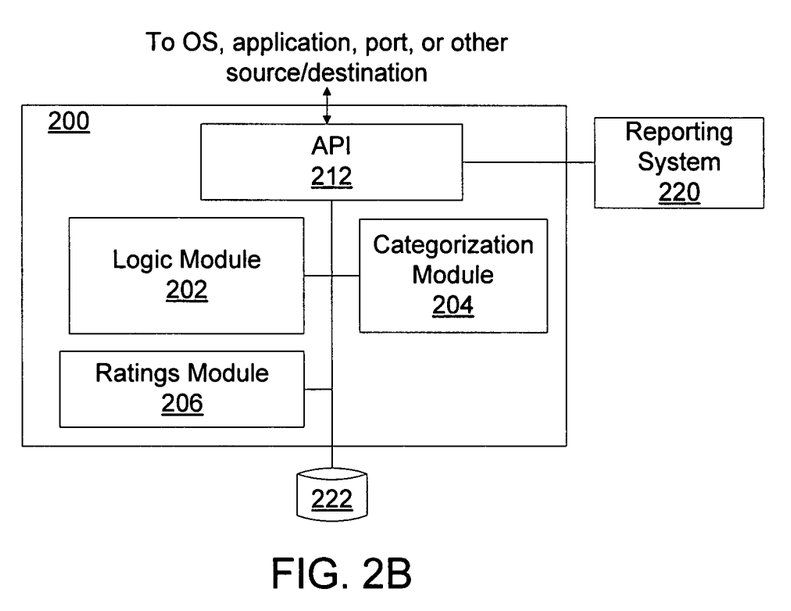
FIG. 2B illustrates an alternative exemplary user-controlled file interaction application.

FIG. 2B illustrates an alternative exemplary user-controlled file interaction application. Here, application 200 includes logic module 202, categorization module 204, ratings module 206, reporting system 220, and repository 222. Application 200 and modules 202-222 may In some examples, one or more of logic module 202, categorization module 204, ratings module 206, reporting system 220, and repository 222 may be implemented externally to application 200. For example, reporting system 220 and repository 222 are shown external to application 200. Reporting system 220 and repository 222 may be implemented using other applications that configured to provide reporting capabilities and storage capacity, respectively. In other examples, different modules apart from those shown may be implemented internally or externally to application 200.

Figure 3A:
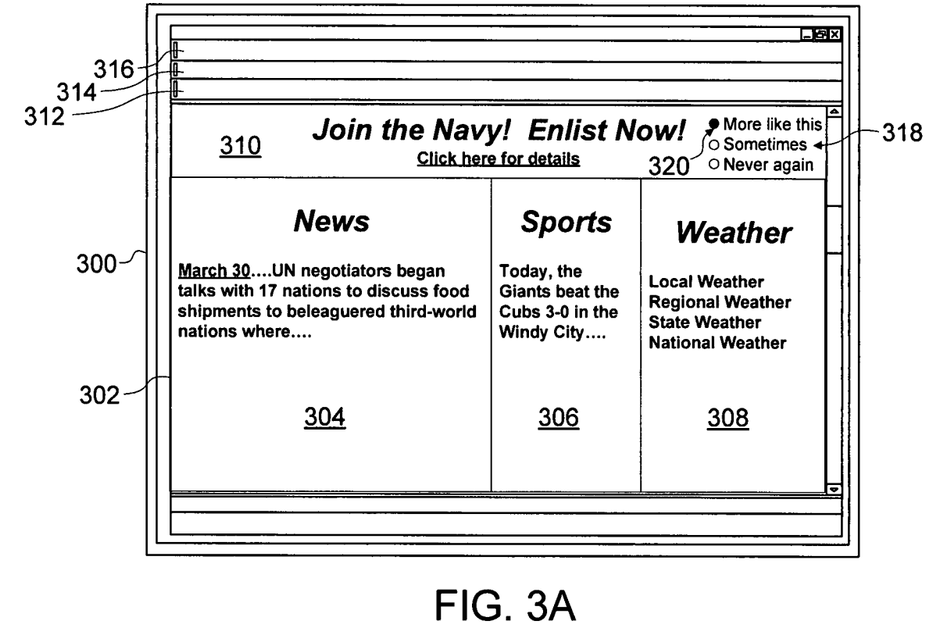
FIG. 3A illustrates an exemplary user-controlled file interaction display using a rating system.

FIG. 3A illustrates an exemplary user-controlled file interaction display using a rating system. Here, display 300 includes panel 302, content sections 304-308, advertisement 310, bars 312-316, and user control panel 318. In some examples, display 300 may be implemented as display 118 (FIGS. 1A-1B), providing an on-screen area of a monitor, display screen, computer screen, or the like on which to present data and information for user-controlled file interaction. When presented, advertisement 310 may be contextually relevant to content presented in content sections 304-308. Advertisement 310 may also be targeted based on demographic information suggestive of the user audience that may be requesting, reading, or otherwise viewing content sections 304-308. In other examples, advertisement 310 may be targeted and served based on other factors beyond those described above.

In some examples, advertisement 310 may be configured with a portion of its layout (e.g., at one end of advertisement 310) made available for presenting user control panel 318. Here, advertisement 310 includes user control panel 318, which may be configured to allow users to input a rating (e.g., "More like this," "Sometimes," "Never again," and others) associated with the ad. When a user inputs a rating (e.g., selecting a radio button next to the selection "More like this"), data (i.e., control data) may be transmitted to ad server 106 and server 108 (FIG. 1A) to indicate a user preference for receiving other advertisements that are similar to advertisement 310. For example, if a user finds a recruiting advertisement for the U.S. Navy interesting, he may also want to view other advertisements for different branches of the Armed Forces. When the input is provided using an input/output device, icon, mechanism, pointer, or the like, a request is sent for other advertisements or files to be sent based upon the user's preference or request. In other examples, display 300 and the above-described elements may be varied in design, implementation, layout, and function and are not limited to the descriptions provided.

Figure 3B:
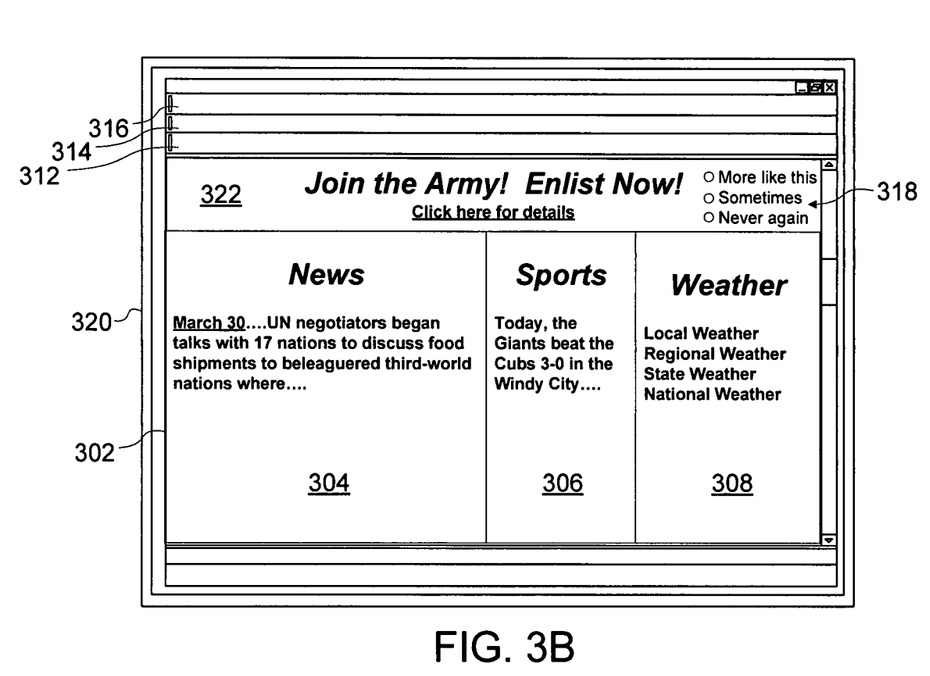
FIG. 3B illustrates an alternative exemplary user-controlled file interaction display using a rating system.

FIG. 3B illustrates an alternative exemplary user-controlled file interaction display using a rating system. Here, display 320 includes panel 302, content sections 304-308, advertisement 322, bars 312-316, and user control panel 318. In some examples, when a rating is provided (e.g., selecting the radio button "More like this" to provide a preference for advertisement 310 (FIG. 1A)), advertisement 322 is served. In other words, if a user wished to see additional advertisements (e.g., advertisement 322) for military recruiting, he can interact with advertisement 310 to provide an input that specifies a preference and, subsequently, receives another similar advertisement (i.e., advertisement 322). Although military recruiting advertisements (e.g., advertisements 310, 322) are used, other contexts, types, shapes, layouts, designs, and formats of advertisements may be used and are not limited to those shown. Further, the above-described examples may be varied and are not limited to the examples shown.

Figure 3C:
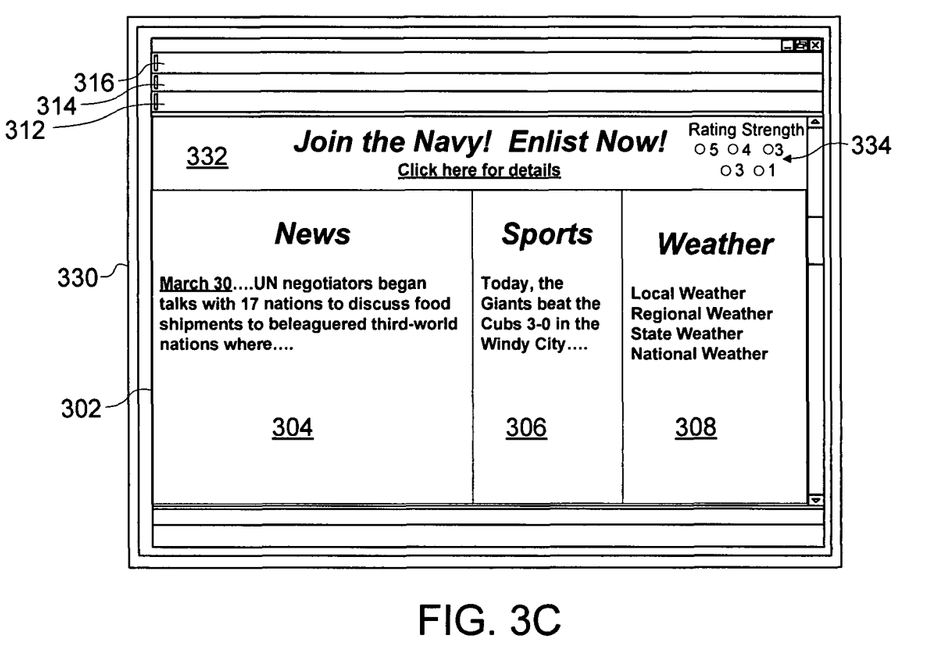
FIG. 3C illustrates an exemplary user-controlled file interaction display using an alternative rating system.

FIG. 3C illustrates an exemplary user-controlled file interaction display using an alternative rating system. Here, display 330 includes panel 302, content sections 304-308, advertisement 332, bars 312-316, and user control panel 334. In some examples, a user may also enter a numerical or quantitative value as a rating. As an example, user control panel 334 is configured to allow a user to select a numerical rating value for advertisement 332. When a value is input, data may be sent from an application supporting window 330 (e.g., web browsing, document authoring/editing, spreadsheet, rich internet applications (RIA), code editing, and others) to one or more servers (e.g., ad server 106, server 108 (FIG. 1A)). Once sent, the data may be stored, aggregated, or grouped together and used by a rating application to determine average, median, or other statistics associated with advertisement 332. If a median value associated with advertisement 332 is below a threshold value of 3, for example, then a different advertisement may be shown. As another example, if a user enters a numerical value that is less than a threshold value, then advertisement 332 may not be served again. In other examples, text or input fields may be provided to allow users to enter information as to what they like or dislike about a given advertisement. Entered information may be used to adjust or control what advertisements are subsequently presented or not presented in window 330. The above-described examples may be varied and are not limited to the descriptions provided.

Figure 3D:
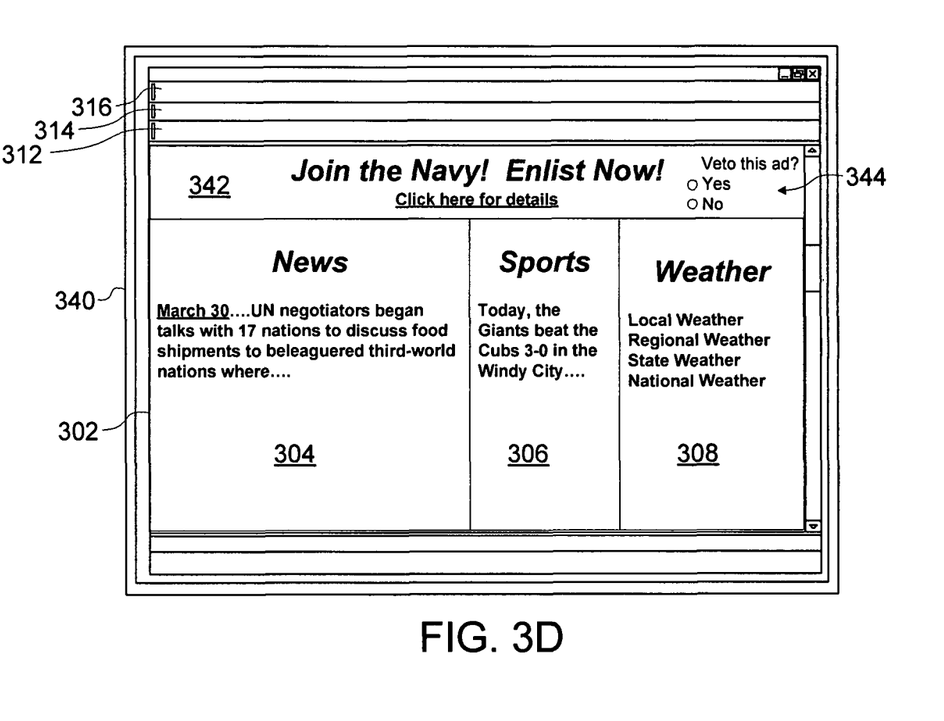
FIG. 3D illustrates another exemplary user-controlled file interaction display using another alternative rating system.

FIG. 3D illustrates another exemplary user-controlled file interaction display using another alternative rating system. Here, display 340 includes panel 302, content sections 304-308, advertisement 342, bars 312-316, and user control panel 344. In some examples, user control panel 344 may be implemented to provide a veto capability for users to veto or approve ads. If a user does not like advertisement 342, she may choose to veto and prevent advertisement 342 or other similar advertisements (e.g., other military recruiting advertisements) from being shown. In other examples, user control panel 334 may be implemented differently in design, layout, and function. Further, display 340 and the above-described elements may be varied in implementation, design, layout, and function and are not limited to the examples shown.

Figure 3E:
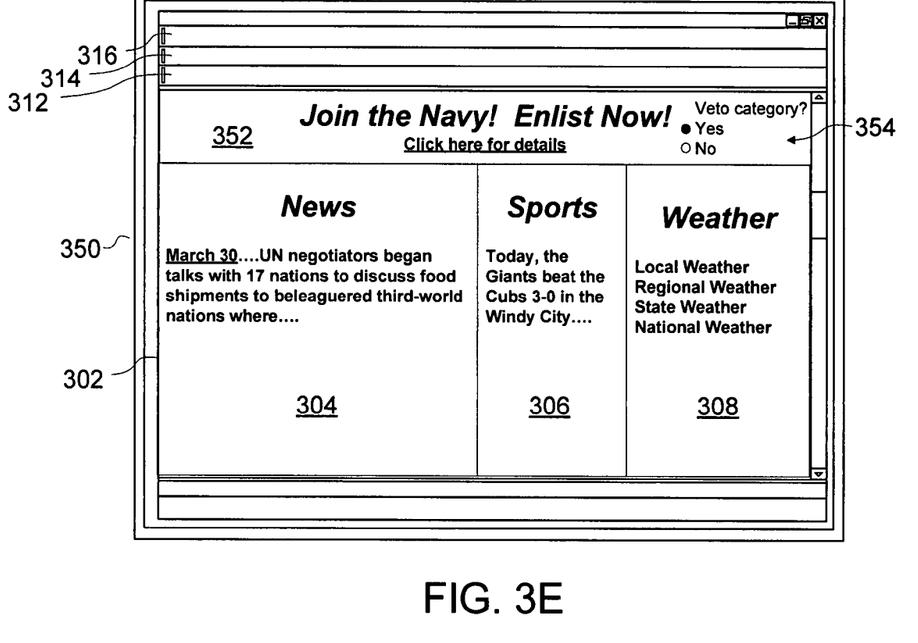
FIG. 3E illustrates an alternative exemplary user-controlled file interaction display using a category rating system.

FIG. 3E illustrates an alternative exemplary user-controlled file interaction display using a category rating system. Here, display 350 includes panel 302, content sections 304-308, advertisement 352, bars 312-316, and user control panel 354. In some examples, users may veto a given advertisement (e.g., advertisement 352). Advertisements may be vetoed individually or categorically. In other words, when an advertisement is presented (e.g., advertisement 352), use control panel 354 may be used to provide a veto for an individual advertisement or a category of advertisements, as described below in greater detail in connection with FIG. 3F. In this example, user control panel 354 may be used to veto a category of advertisements (e.g., military recruiting advertisements).

Figure 3F:
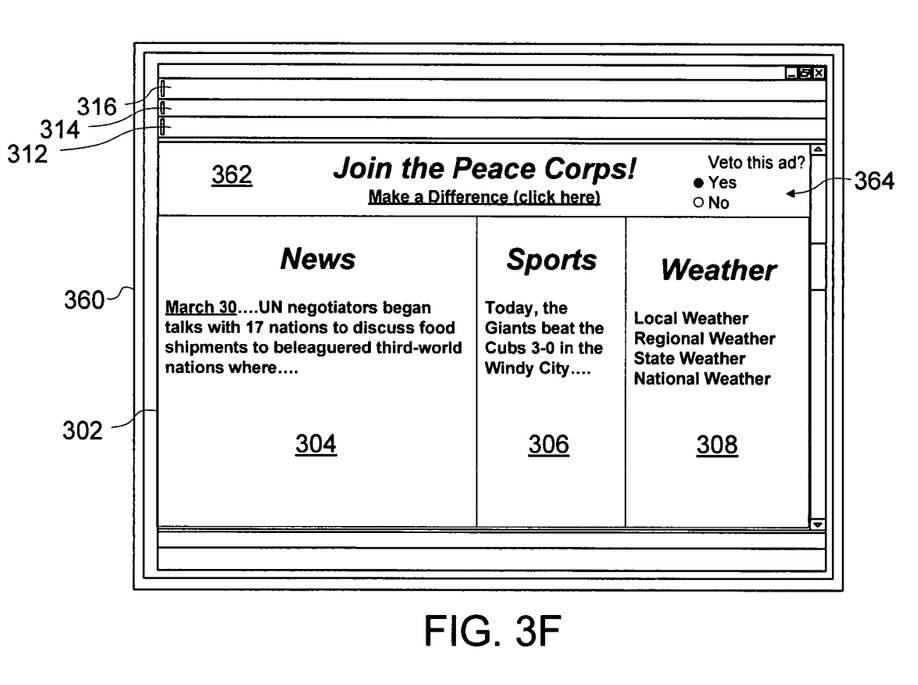
FIG. 3F illustrates a further exemplary user-controlled file interaction display using an advertisement veto system.

FIG. 3F illustrates a further exemplary user-controlled file interaction display using an advertisement veto system. Here, display 360 includes panel 302, content sections 304-308, advertisement 362, bars 312-316, and user control panel 364. In some examples, when an advertisement is vetoed (e.g., advertisement 352 (FIG. 3E)) using user control panel 364, a different advertisement (e.g., advertisement 362) or different category of advertisements may be presented. As an example, if a user vetoes the category of military recruiting advertisements, other advertisements for job recruiting (e.g., the Peace Corps) may be presented. Likewise, if the newly-presented advertisement is not desired, user control panel 364 may be employed to further veto, rate, or otherwise provide inputs such as control data to determine the types of advertisements that a user wishes to view. In other examples, the above-described techniques may be varied and are not limited to those shown and described.

Figure 3G:
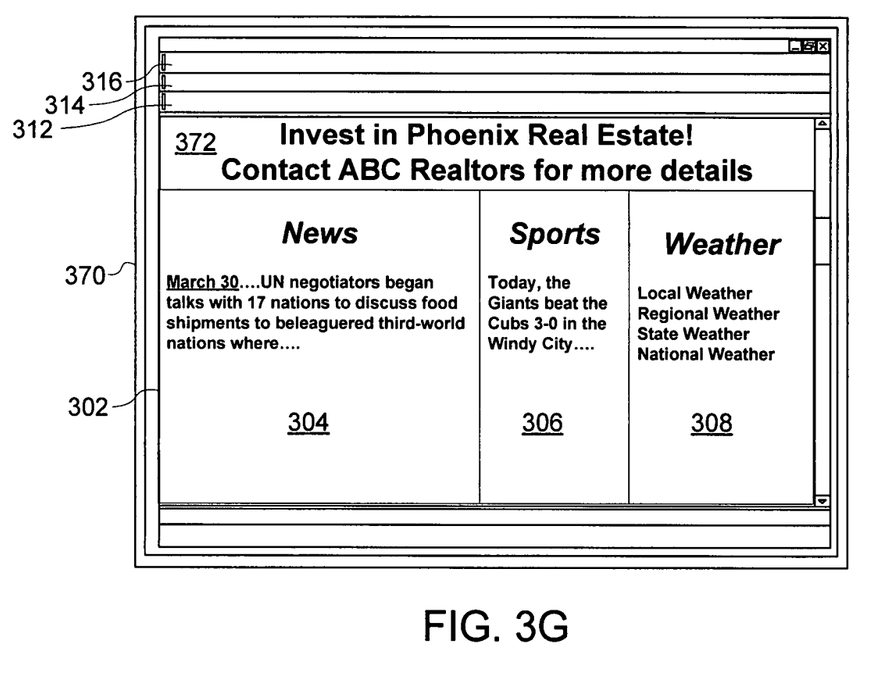
FIG. 3G illustrates yet another exemplary user-controlled file interaction display.

FIG. 3G illustrates yet another exemplary user-controlled file interaction display. Here, display 370 includes panel 302, content sections 304-308, advertisement 372, and bars 312-316. As an example, if a user vetoes a category of advertisements (e.g., recruiting or career advertisements) altogether, then another category of advertisements (e.g., real estate, automotive, educational, childcare, products, services, and others). In some examples, advertisements may be categorized using schemas such as North American Industry Classification System (NAICS), Standard Industrial Classification (SIC) system, customized schemas, and others. In other examples, advertisements may be categorized using different techniques and are not limited to the examples shown and described. Further, users may also create new categories or modify existing categories. In still other examples, the above-described techniques may be varied and are not limited to the examples provided.

Figure 3H:
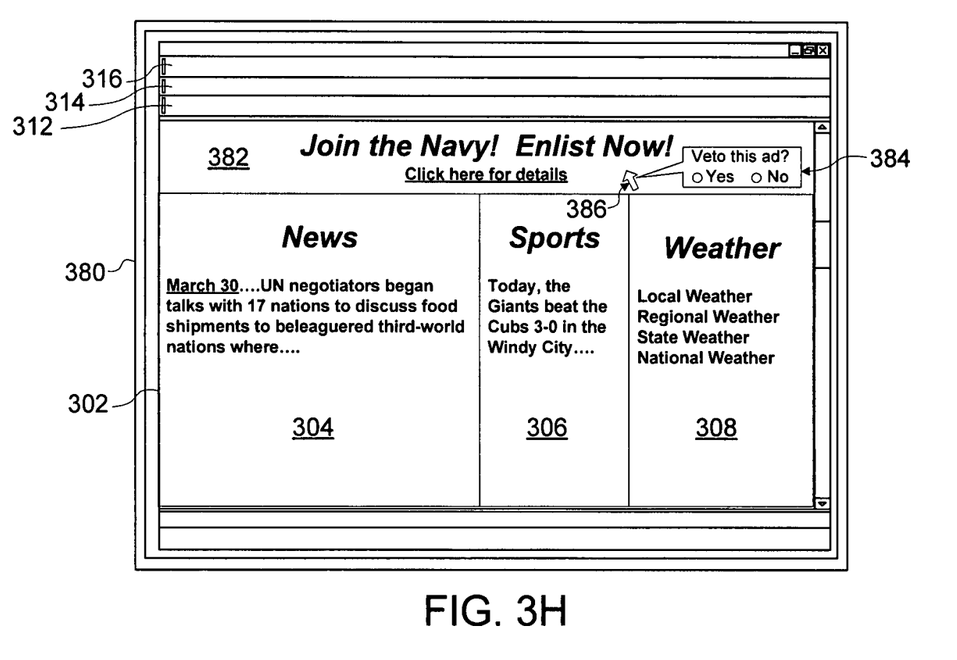
FIG. 3H illustrates yet another exemplary user-controlled file interaction display using an alternative presentation of a veto system.

FIG. 3H illustrates yet another exemplary user-controlled file interaction display using an alternative presentation of a veto system. Here, display 380 includes panel 302, content sections 304-308, advertisement 382, bars 312-316, user control panel 384, and pointer 386. In some examples, user control panel 384 may be implemented using different application, rendering, instantiation, and objects. For example, when a user moves pointer 386 from, for example, one of content sections 304-308 to advertisement 382, a "callout" bubble may appear and present user control panel 384. Here, user control panel 384 is not viewable unless a user interacts with advertisement 382. User interaction, in some examples, may be a user scrolling over advertisement 382, moving a pointer or icon, clicking on a region or element (e.g., image, title, name, and the like), or performing another action on a user interface (e.g., display 380) that may be configured to initiate a process for inputting data to an application (e.g., ratings application 116 (FIG. 1A)).

Once presented, user control panel 384 may be used to provide input that specifies a preference as to whether to veto advertisement 382. In other examples, user control panel 384 may be configured differently to allow input of numerical, quantitative, or subject data and information. For example, a text input field may be provided to allow users to specify types of advertisements to serve on display 380. As another example, a survey of questions may be presented (e.g., FIG. 3A) to allow users to specify whether they like or dislike given advertisements. In still other examples, user control panel 384 may be implemented differently in terms of design, layout, and function, and are not limited to the examples provided.

Figure 4:
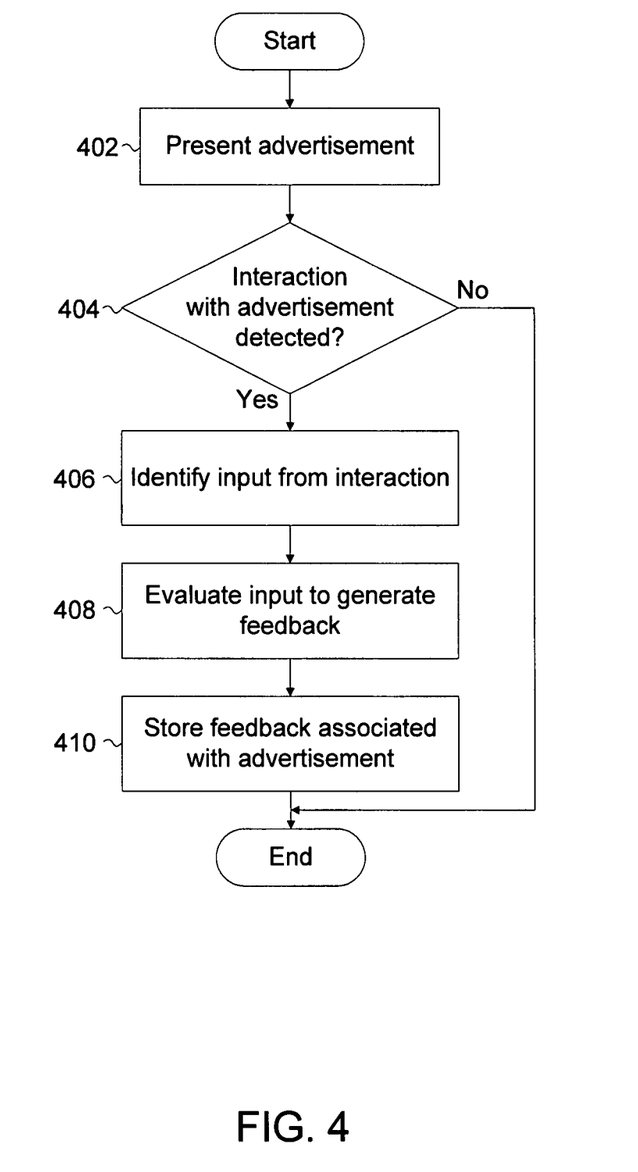
FIG. 4 illustrates an exemplary process for user-controlled file interaction.

FIG. 4 illustrates an exemplary process for user-controlled file interaction. Here, an advertisement is presented on a display, screen, or other user interface (402). A determination is made as to whether an interaction with the advertisement has been detected (404). If an interaction has not been detected with an advertisement, then the process ends. However, if an interaction with an advertisement has been detected, then input is identified from the associated interaction (406). After identifying input provided by a user interacting with an advertisement, the input is evaluated, for example, by logic module 202 (FIGS. 2A-2B) to determine feedback associated with the advertisement (408). For example, a user interaction may have an input provided in a user control panel (e.g., user control panel 318 (FIG. 3A)) that identifies affinity for an advertisement presented on an interface (i.e., display). The feedback is then stored and may be later accessed for various purposes such as report generation, performance analysis, statistical data mining (e.g., number of advertisements served, number of click through, feedback provided by users, number of users wanting to see other similar advertisements, number of users rejecting the advertisement, and the like) (410). Using the above-described process enables users to control advertisements and other files presented on an interface or display. In other examples, files other than advertisements may be implemented using the techniques described above. For example, a web browsing application may implement user-control techniques such as those described above to allow users to control types of files or content presented on an interface. In other examples, the above-described process may be varied in implementation, order, execution, and design, and is not limited to the examples provided above.

Figure 5A:
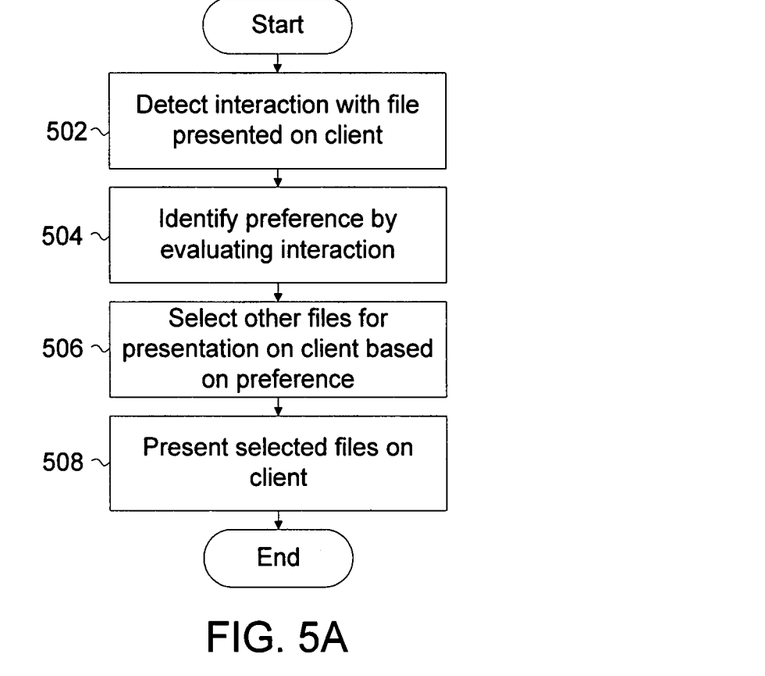
FIG. 5A illustrates an alternative exemplary process for user-controlled file interaction.

FIG. 5A illustrates an alternative exemplary process for user-controlled file interaction. Here, an interaction with a presented file is detected (502). A preference is identified from the interaction by evaluating associated with input received from the interaction (504). For example, when a user clicks on a radio button indicating she wishes to see more similar files, control data may be sent to an application that is configured to identify other similar files. Based on the preference, other files are selected for presentation (506). In some examples, other files may be selected based on a preference for more similar types of files. In other examples, other files may be selected based on a preference for different types of files. Files or file types may be selected based on categories, classifications, characteristics, or other attributes and are not limited to the examples provided. Once selected, subsequent files chosen based on the preference identified in the input are then displayed on, for example, an interface (508). In other examples, the above-described process may be varied and is not limited to those provided.

Figure 5B:
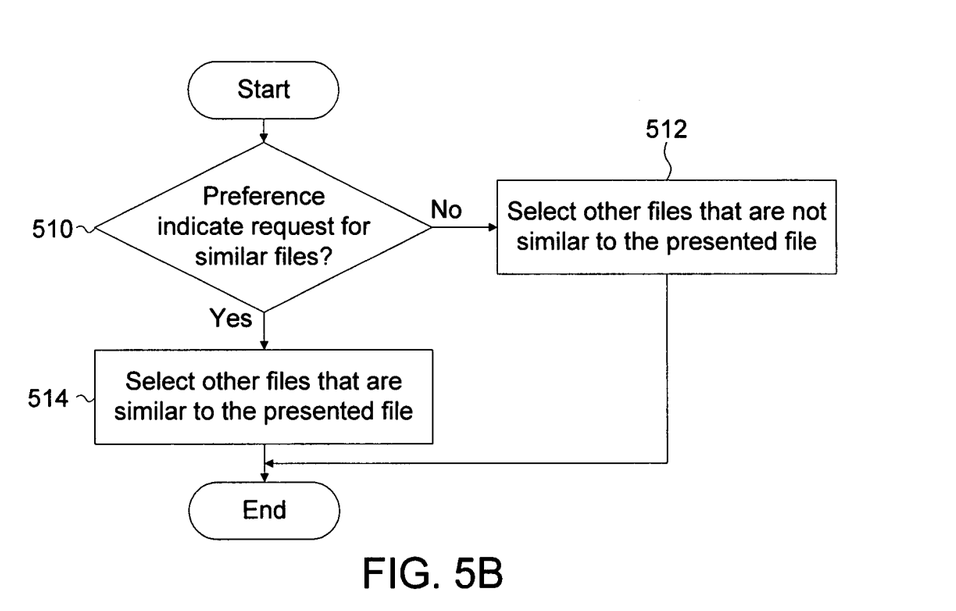
FIG. 5B illustrates an exemplary process for selecting an advertisement using a user-controlled file interaction system.

FIG. 5B illustrates an exemplary process for selecting an advertisement using a user-controlled file interaction system. Here, a determination is made as to whether an identified preference indicates a request for similar files or similar types of files (510). If the preference does not indicate a desire for similar types of files, then different files are selected (512). If the preference indicates a desire for similar types of files, then similar files or similar types of files are selected for retrieval and delivery to a display (i.e., an interface) (514). In other examples, the above-described process may be varied and is not limited to the descriptions provided.

Figure 6:
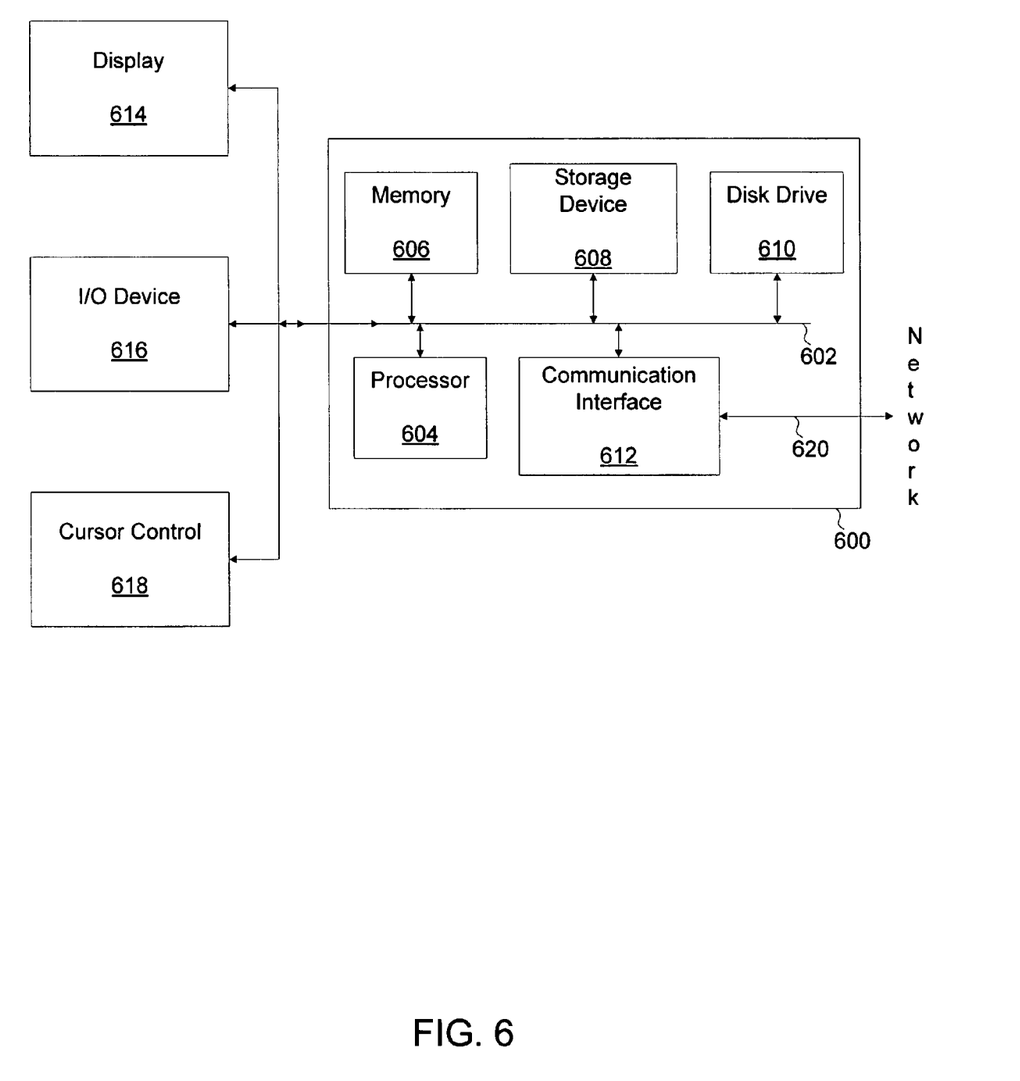
FIG. 6 illustrates an exemplary computer system suitable for user-controlled file interaction.

FIG. 6 illustrates an exemplary computer system suitable for user-controlled file interaction. In some examples, computer system 600 may be used to implement computer programs, applications, methods, processes, or other software to perform the above-described techniques. Computer system 600 includes a bus 602 or other communication mechanism for communicating information, which interconnects subsystems and devices, such as processor 604, system memory 606 (e.g., RAM), storage device 608 (e.g., ROM), disk drive 610 (e.g., magnetic or optical), communication interface 612 (e.g., modem or Ethernet card), display 614 (e.g., CRT or LCD), input device 616 (e.g., keyboard), and cursor control 618 (e.g., mouse or trackball).

According to some examples, computer system 600 performs specific operations by processor 604 executing one or more sequences of one or more instructions stored in system memory 606. Such instructions may be read into system memory 606 from another computer readable medium, such as static storage device 608 or disk drive 610. In some examples, hard-wired circuitry may be used in place of or in combination with software instructions for implementation.

The term "computer readable medium" refers to any medium that participates in providing instructions to processor 604 for execution. Such a medium may take many forms, including but not limited to, non-volatile media, volatile media, and transmission media. Non-volatile media includes, for example, optical or magnetic disks, such as disk drive 610. Volatile media includes dynamic memory, such as system memory 606. Transmission media includes coaxial cables, copper wire, and fiber optics, including wires that comprise bus 602. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 600. According to some examples, two or more computer systems 600 coupled by communication link 620 (e.g., LAN, PSTN, or wireless network) may perform the sequence of instructions in coordination with one another. Computer system 600 may transmit and receive messages, data, and instructions, including program, i.e., application code, through communication link 620 and communication interface 612. Received program code may be executed by processor 604 as it is received, and/or stored in disk drive 610, or other non-volatile storage for later execution.

The foregoing examples have been described in some detail for purposes of clarity of understanding, but are not limited to the details provided. There are many alternative ways and techniques for implementation. The disclosed examples are illustrative and not restrictive.

What is claimed:
1. A method, comprising:
  performing by a computer:

presenting an advertisement;
  detecting an interaction with the advertisement, the interaction comprising an input provided in response to the advertisement;
  evaluating the input to determine feedback associated with the advertisement, wherein the input indicates a preference for a category of advertisements, wherein the category of advertisements includes a plurality of advertisements that are logically grouped and comprise the advertisement; and
  using the feedback to select other advertisements.

2. The method of claim 1, further comprising storing the feedback with other feedback to provide a result, wherein the result is associated with performance of the advertisement.

3. The method of claim 1, further comprising storing the input and the interaction in a repository, the repository being configured for access.

4. The method of claim 1, wherein the advertisement is presented with other content.

5. The method of claim 1, wherein presenting the advertisement further comprises displaying a web page comprising the advertisement and other content.

6. The method of claim 1, wherein the interaction comprises moving a pointer over the advertisement.

7. The method of claim 1, wherein the interaction comprises selecting a region of the advertisement.

8. The method of claim 1, wherein the input is a rating.

9. The method of claim 8, wherein the rating is stored with other ratings.

10. The method of claim 1, further comprising detecting another interaction with another advertisement, wherein the another interaction comprises an input that is a veto of the another advertisement.

11. The method of claim 1, wherein the input indicates a preference associated with the advertisement.

12. The method of claim 1, wherein using the feedback to select other advertisements further comprises preventing further presentation of the advertisement if the input comprises a rating that is below a threshold value.

13. A method, comprising:
  performing by a computer:
    detecting an interaction with a file presented on a client, the interaction indicating a preference for a category of files, wherein the category of files includes a plurality of files that are logically grouped and comprise the file;
    selecting other files for presentation based on the preference; and
    presenting the other files selected for presentation on the client.

14. The method of claim 13, wherein the file is an advertisement.

15. The method of claim 13, wherein the file is accessed from a database.

16. The method of claim 13, further comprising detecting another interaction with another file, wherein the another interaction indicates a preference that is a veto of the another file.

17. The method of claim 13, wherein the preference is a rating.

18. The method of claim 17, wherein the other files are selected from the category indicated by the preference.

19. The method of claim 13, wherein the preference is a rating, the rating being used to select the other files if the rating is greater than a threshold value.

20. The method of claim 13, wherein the preference is a rating, the rating being used to select the other files if the rating is less than a threshold value.

21. The method of claim 13, wherein the preference comprises a rating, the rating being used to select the other files if the rating is greater than or equal to a threshold value.

22. The method of claim 13, wherein the preference comprises a rating, the rating being used to select the other files if the rating is less than or equal to a threshold value.

23. A system, comprising:
  a memory configured to store data associated with an advertisement; and
  logic configured to:
    present an advertisement;
    detect an interaction with the advertisement, the interaction comprising an input provided in response to the advertisement;
    evaluate the input to determine feedback associated with the advertisement, wherein the input indicates a preference for a category of advertisements, wherein the category of advertisements includes a plurality of advertisements that are logically grouped and comprise the advertisement; and
    use the feedback to select other advertisements.

24. The system of claim 23, wherein the input is stored in the memory with other inputs.

25. A system, comprising:
  a repository configured to store data associated with a file and a preference provided in response to the file;
  a processor configured to:
    detect an interaction with the file presented on a client, the interaction indicating a preference for a category of files, wherein the category of files includes a plurality of files that are logically grouped and comprise the file;
    select other files for presentation based on the preference; and
    present the other files on the client.

26. The system of claim 25, wherein the preference is a rating provided using an application configured to accept ratings.

27. The system of claim 25, wherein the interaction comprises a request for the other files.

28. The system of claim 25, wherein the interaction comprises a request to prevent presentation of the other files if the other files are not similar to the file.

29. A computer readable storage medium storing a computer program product comprising computer instructions computer-executable for:
  presenting an advertisement;
  detecting an interaction with the advertisement, the interaction comprising an input provided in response to the advertisement, wherein the input indicates a preference for a category of advertisements, wherein the category of advertisements includes a plurality of advertisements that are logically grouped and comprise the advertisement;
  evaluating the input to determine feedback associated with the advertisement; and
  using the feedback to select other advertisements.

30. A computer readable storage medium storing a computer program product comprising computer instructions computer-executable for:
  detecting an interaction with a file presented on a client, the interaction indicating a preference for a category of files, wherein the category of files includes a plurality of files that are logically grouped and comprise the file;

selecting other files for presentation based on the preference; and presenting the selected other files on the client.

* * * * *